(No Model.)  2 Sheets—Sheet 1.
J. A. NORDSTEDT.
MACHINE FOR CUTTING WORM WHEELS.
No. 373,192.  Patented Nov. 15, 1887.
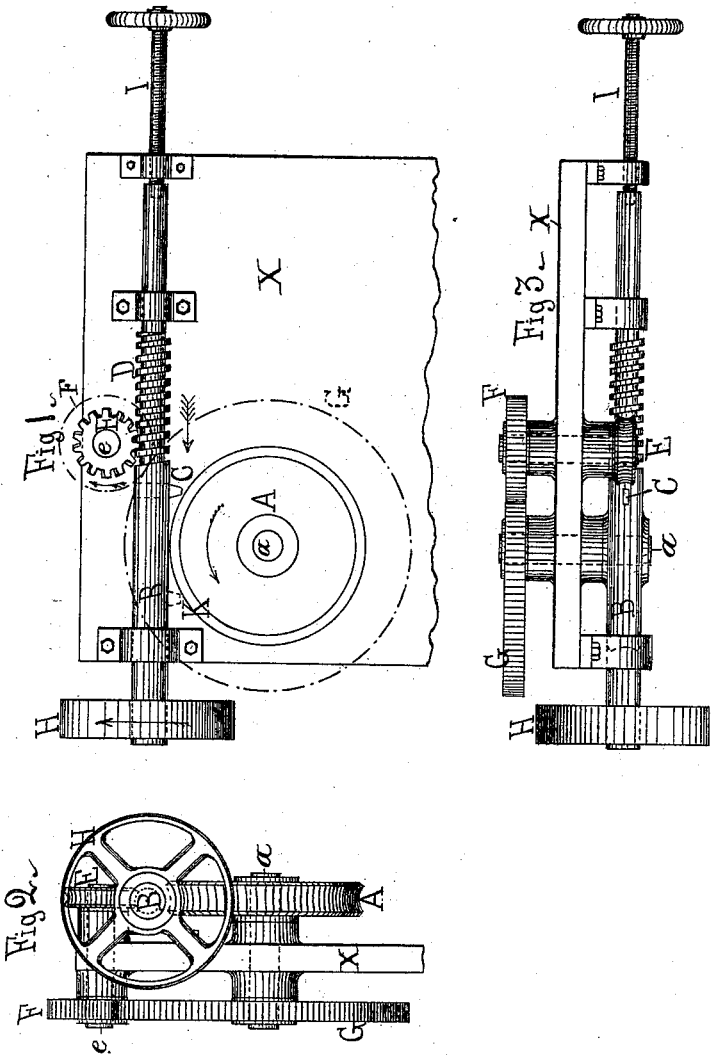

(No Model.) 2 Sheets—Sheet 2.
J. A. NORDSTEDT.
MACHINE FOR CUTTING WORM WHEELS.
No. 373,192. Patented Nov. 15, 1887.
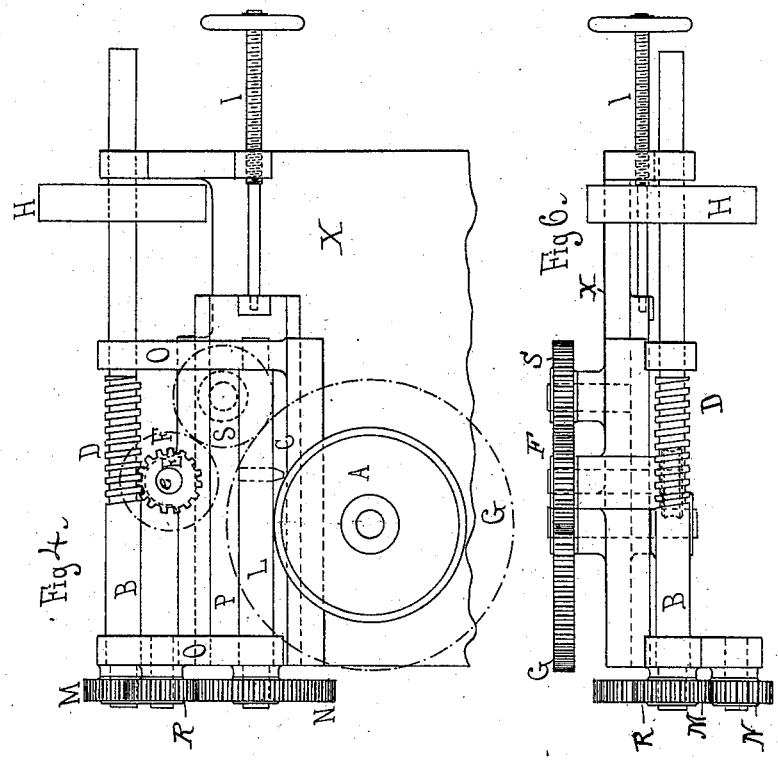
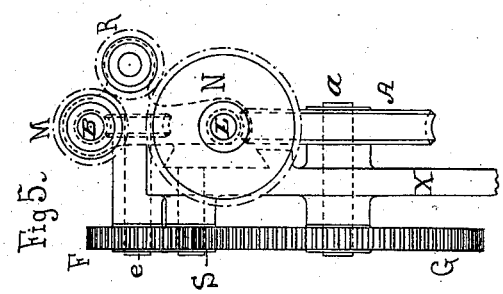

UNITED STATES PATENT OFFICE.

JOHAN ADOLF NORDSTEDT, OF SUNDBYBERG, SWEDEN.

MACHINE FOR CUTTING WORM-WHEELS.

SPECIFICATION forming part of Letters Patent No. 373,192, dated November 15, 1887.

Application filed June 3, 1887. Serial No. 240,129. (No model.)

*To all whom it may concern:*

Be it known that I, JOHAN ADOLF NORDSTEDT, a subject of the King of Sweden, and a resident of Sundbyberg, Sweden, have invented certain new and useful Improvements in Machines for Cutting the Teeth of Worm-Wheels, of which the following is a specification.

The old method of cutting worm-wheels with curved teeth is a very slow and expensive operation, and at best the teeth are not accurately cut, especially when the pitch of the proposed driving-screw is large in comparison with its diameter. In fact, for very large pitches it has hitherto been impossible to cut the teeth of the wheels with curved faces, and straight teeth have been generally used as being easily cut on an ordinary gear-cutting machine; but the shape of teeth so cut is very far from correct.

The object of my invention is to provide a means for cutting the teeth of worm-wheels of any pitch easily, quickly, and accurately and of theoretically correct form.

In the drawings, which serve to illustrate my invention, I have shown two forms of the mechanism, both of which will be hereinafter described.

Figure 1 is a front elevation of one form of the machine. Fig. 2 is an end view of same, and Fig. 3 is a plan. Figs. 4, 5, and 6 are respectively a front view, an end view, and a plan of the other form of the machine.

Referring to the first three figures of the drawings, which represent the machine in its simplest form, X is a suitable base or frame to support the mechanism, and A is the worm-wheel to be cut. This wheel is secured to a shaft, $a$, rotatively mounted in frame X.

B is a shaft rotatively mounted in bearings on the frame, tangent to wheel A, and its axis in a plane which passes edgewise through said wheel. On or in shaft B is fixed a cutter, C, which has the same form and size as a cross-section of a thread of the screw that is intended to be used to drive the worm-wheel.

On the shaft B is a screw, D, and this screw has the same pitch as that of the intended driving-screw. This screw D meshes with a worm-wheel, E, secured to a shaft, $e$, rotatively mounted in frame X. On the other end of the shaft $e$ is secured a pinion, F, which meshes with a spur-wheel, G, secured on the shaft $a$, bearing the wheel A. The wheels F and G are so proportioned as to size or number of teeth that a point in the pitch-circle of wheel A will travel with the same speed as a point in the pitch-circle of wheel E.

The shaft B is capable of being moved longitudinally in its bearings, and this may be effected by means of a screw, I, or other suitable mechanism. Said shaft may be rotated by a pulley, H, or by a crank. Shaft B is set in motion—as by a belt on pulley H, for example—and said shaft is moved endwise (toward the left in Fig. 1) until the cutter C touches wheel A. The cutting now begins, and at the termination of each revolution of wheel A the shaft B is moved a little forward longitudinally by screw I, to effect the proper feed. This feeding is continued until the cutter has passed across the wheel tangentially and assumed the position seen in dotted lines at K in Fig. 1, when the cutting operation will have been completed.

The arrows in Fig. 1 indicate the direction of movement of the several parts.

By the mechanical arrangement above described, and illustrated in Figs. 1, 2, and 3, it is only possible to cut worm-wheels with the same pitch as the screw-thread D, and this will be all that is required in cases where a great many like wheels are to be cut. The simplicity of the machine will recommend it for such use. In Figs. 4, 5, and 6 I have shown the same principles embodied in a more complex machine for general use, wherewith it is possible to cut a wheel with a pitch different from that of screw D. This construction I will now describe. The cutter C in this case is mounted on or in a shaft, L, driven from shaft B through the medium of gear-wheels M, R, and N, the former being on shaft B and the latter on shaft L. The wheel R is merely an intermediate to compel the shafts B and L to rotate in the same direction. Both shafts B and L have bearings in the same bearing-brackets, O O, on a slide, P, mounted in guides or keepers on the frame X. The feed-screw I is applied to the slide P in this case, and when this slide is moved it will of course carry the shafts B and L and their connecting-gears along with it.

In order to cut teeth in wheel A with a pitch different from the pitch of screw D, the number of teeth in the wheels M and N must be proportioned to this difference. For example, if the pitch of wheel A is to be double that of screw D, wheel N must have twice as many teeth as pinion M. This is the proportion shown in the drawings. The usual "change-wheels" may be employed to effect the proper result. To cut worm-wheels of different diameters on the machine it is only necessary to mount the shaft $a$ in an adjustable slide on frame X, instead of directly on the frame itself. The wheels F and G will in this case be what are called "change-wheels," and different sets or pairs may be employed when necessary in order to preserve the relative proportions of wheels F and G. The wheel S is merely an intermediate between wheels F and G, and it performs the same function as wheel R.

I have not deemed it necessary to show shaft $a$ mounted in a slide, as this is a feature within the knowledge of any good workman.

In the face views of the gear-wheels I have not shown their teeth, but have merely indicated their pitch-circles by dotted lines. They will be ordinary toothed wheels.

To allow for the endwise movement of shaft B the driving-pulley H (when employed) may have a wide face for the narrower belt to traverse, or any other well-known device or means of this character may be employed.

My invention embraces the method of cutting the teeth of gear-wheels described, as well as the special machine for the purpose.

Having thus described my invention, I claim—

1. The herein-described method of cutting the teeth of worm-wheels, which consists in simultaneously rotating the cutter and the wheel in which the teeth are to be cut and in feeding the cutter in the direction of its axis of rotation tangentially to the face of the wheel to be cut, substantially as set forth.

2. In a machine for cutting the teeth of worm-wheels, the combination of the shaft B, provided with a screw, D, means for moving said shaft longitudinally to effect the feed, the revolving cutter carried or driven by shaft B, the worm-wheel E and its shaft, said wheel meshing with screw D, the shaft $a$, to receive the wheel to be cut, and the gear-wheels F and G, through which shaft $e$ drives shaft $a$.

3. The combination, with the main frame and the slide P, mounted thereon, of the shafts B and L, mounted in bearings in said slide, shaft B being provided with a screw, D, the cutter C, carried by shaft L, the gear-wheels whereby shaft B drives shaft L, means whereby shaft B is moved in a line parallel with the axes of shafts B and L, the worm-wheel E and its shaft $e$, said worm-wheel meshing with screw D, the shaft $a$, carrying the wheel to be cut, and the gear-wheels whereby shaft $e$ drives shaft $a$, the axis of shaft L being arranged at right angles to the axis of shaft $a$, substantially as set forth.

In witness whereof I have hereunto signed my name in the presence of two subscribing witnesses.

JOHAN ADOLF NORDSTEDT.

Witnesses:
NERE A. ELFWING,
E. H. BRUHN.